Jan. 18, 1938. B. O. SMITH 2,105,619
DEVICE FOR DEPICTING PREVAILING AIR CURRENTS OF THE EARTH
Filed June 22, 1936 2 Sheets—Sheet 2
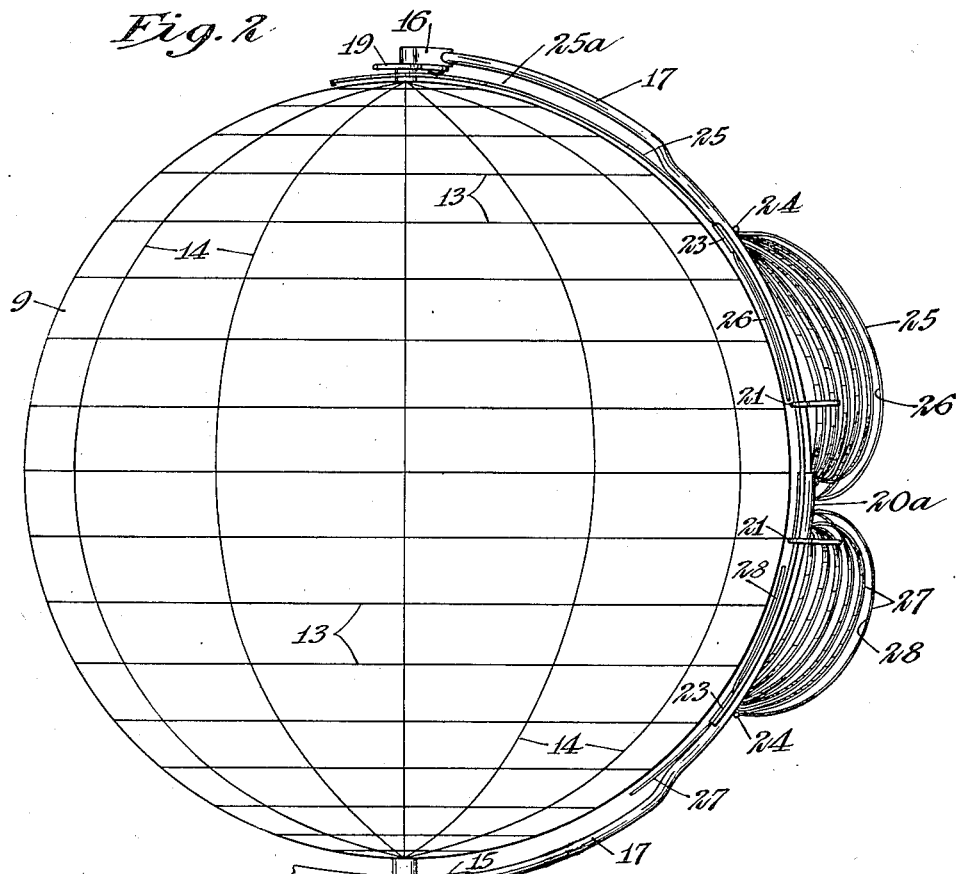
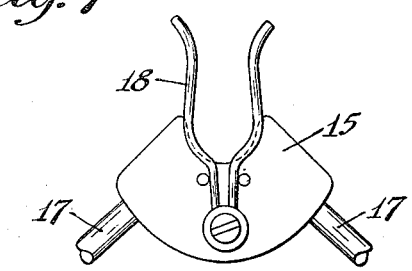
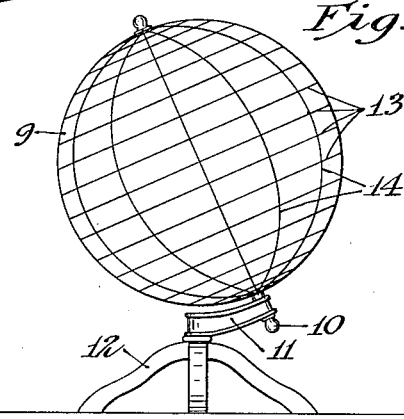
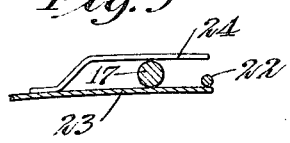
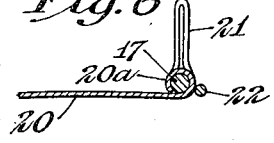
Inventor
Bertha O. Smith
By her Attorneys
Williamson & Williamson Patented Jan. 18, 1938

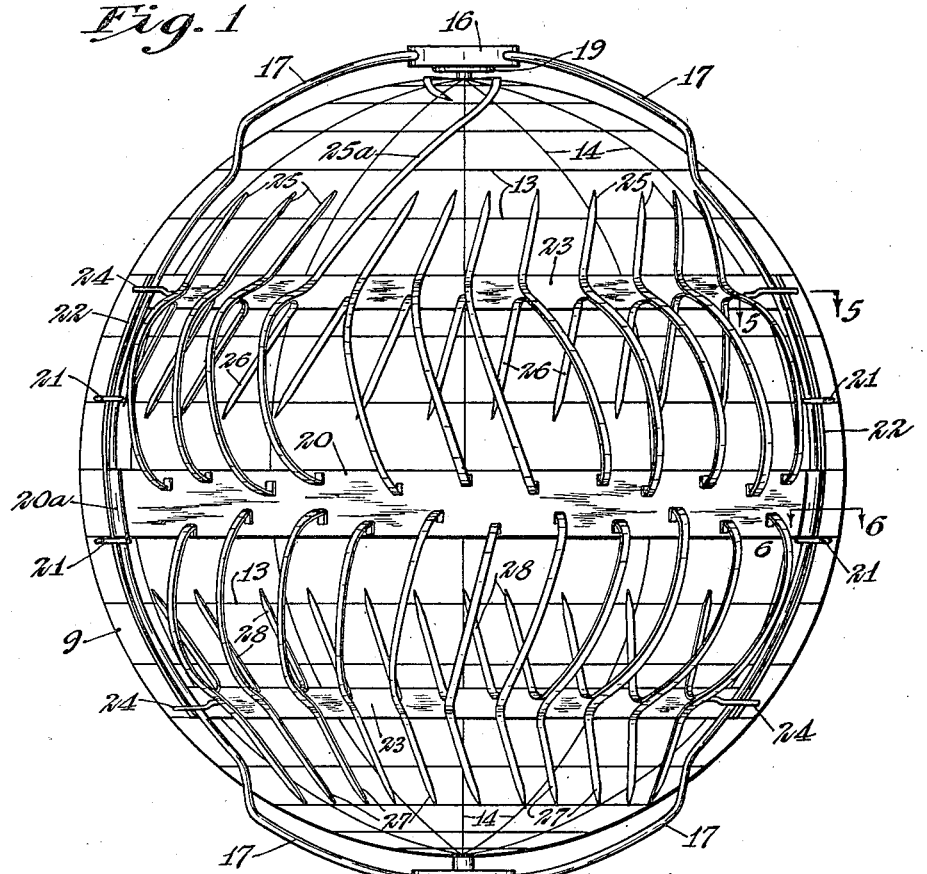
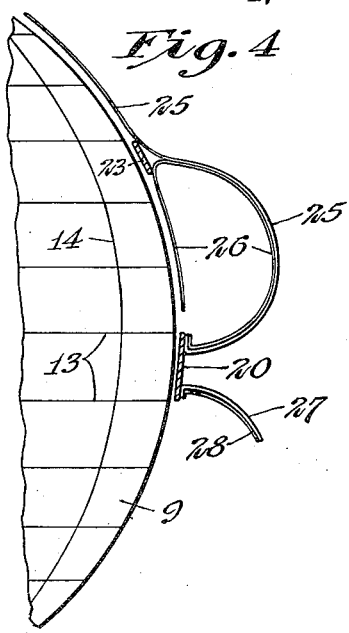
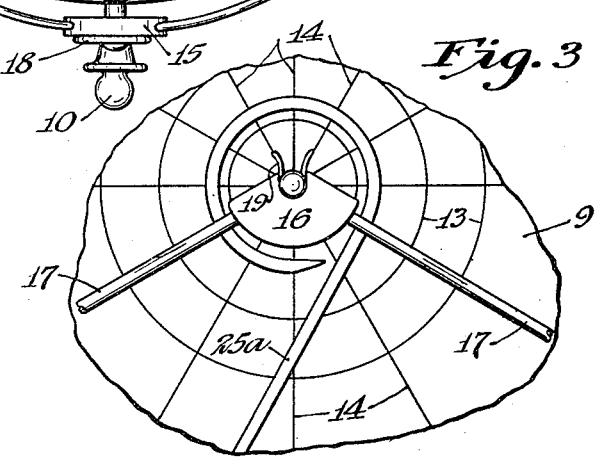

2,105,619

UNITED STATES PATENT OFFICE 2,105,619

DEVICE FOR DEPICTING PREVAILING AIR CURRENTS OF THE EARTH

Bertha O. Smith, Minneapolis, Minn., assignor of one-half to Anice L. Godfrey, Minneapolis, Minn.

Application June 22, 1936, Serial No. 86,561

5 Claims. (Cl. 35—46)

This invention relates to educational devices for depicting the paths of prevailing air currents about the earth.

It is the general object of the invention to provide a novel educational device, which can be used to graphically illustrate to children and others how the air currents travel over the earth.

More specifically it is the object of the invention to provide in combination with a geographical globe, structure illustrative of the paths taken by the prevailing winds on the earth.

The objects and advantages of the invention will more fully appear from the following description, made in connection with the accompanying drawings, wherein a device embodying the invention is shown and wherein like reference characters refer to the same or similar parts throughout the various views and, in which, Fig. 1 is a view in side elevation of the device of the invention applied to the ball section of a geographical globe;

Fig. 2 is a view looking toward the left of the structure shown in Fig. 1;

Fig. 3 is a partial plan view looking toward the North pole of the globe shown in Fig. 1;

Fig. 4 is a vertical section taken through a portion of the device but showing only a few of the wind direction indicating elements;

Fig. 5 is a horizontal section taken on the line 5—5 of Fig. 1, as indicated by the arrows;

Fig. 6 is a horizontal section taken on the line 6—6 of Fig. 1, as indicated by the arrows;

Fig. 7 is a view looking upwardly toward the bottom of the lower attachment clip; and Fig. 8 is a view on a small scale illustrating a type of geographical globe that I may use with my device.

In order to better understand the present invention, certain facts relative to the movements of prevailing air currents relative to the surface of the earth should be briefly referred to. Encircling the equator through approximately 10° of latitude is a belt of calms known as the doldrum belt. This doldrum belt shifts during different seasons of the year through 10° of latitude so that the lower edge of this belt, when the belt has shifted to its southern most position, lies in approximately 10° south latitude and so that the upper edge of this belt, when the belt has shifted to its northern most position, lies in approximately 10° north latitude. The doldrum belt, although in itself a belt of calms, is a source of air current movement. The air being intensely heated in this belt rises from the earth to an indeterminate height of approximately one hundred miles or more. In the rarefied atmosphere, the air splits and moves north and south generally to form what are known as the north and south anti-trade winds, these winds moving in the northern hemisphere and in the southern hemisphere also in a somewhat westerly direction, i. e. the northern anti-trade winds move northwest and the southern anti-trade winds move southwest. The north and south anti-trade winds continue in their respective directions until the air cools and becomes heavier, whereupon these winds take a downward course back to earth to strike the earth in belts known as the horse latitudes. The northern horse latitude is a belt of approximately 5° of latitude which has a shifting movement through 10° of latitude as in the case of the doldrum belt. The northern horse latitude in its lowest position has its southern edge located at 25° north latitude and in its highest position its northern edge is located at 40° north latitude. The southern horse latitude has a similar shifting movement and is similarly located in the southern hemisphere.

As the northern anti-trade winds strike the northern horse latitude on the earth, the winds split to form what are known as the northeast trade winds (moving southwest from the northern horse latitude) and the northern westerly winds (moving northeast to and around the North Pole from the northern horse latitude). As the southern anti-trade winds strike the southern horse latitude on the earth, the winds similarly split to form what are known as the southeast trade winds (moving northwest from the southern horse latitude) and the southern westerly winds (moving southeast to and around the South Pole from the southern horse latitude).

The present device is used for illustrating in connection with a globe the different winds above referred to.

Referring now to the drawings, I mount my device on an ordinary geographical globe of the earth. The globe proper 9 is mounted to rotate on a shaft 10 having knobs at its two ends, this shaft being carried by an arm 11 rotatably carried by a base 12. The globe 9 is provided with the usual latitude marks 13 and longitude marks 14 and although the continents of the earth are not illustrated on the globe 9, they of course will be shown in accordance with the usual practice on this globe.

In accordance with the invention, a frame is applied to the geographical globe and this frame includes lower and upper blocks 15 and 16 respectively and a pair of rods 17 of general arcuate shape connected to the blocks 15 and 16. The lower block 15 is releasably engaged with the arm 11 of the globe by means of a spring clip 18, the two jaws of which engage the shaft carrying portion of the arm 11 between upper and lower projecting ribs on the arm. The upper block 16 is releasably attached to the top knob on shaft 10 by means of a spring clip 19, the two jaws of which receive the knob between them. When the frame is applied to the geographical globe, the two rods 17 overlie the globe proper and extend from adjacent the North Pole to adjacent the South Pole, the two rods being located along longitude lines of the globe. Preferably the central portions of the two rods 17 are inwardly offset toward the globe 9 relative to the end portions so as to permit proper clearance between the end portions of the rod and the blocks 15 and 16 while at the same time permitting the central portions of the rods to lie contiguous to the central part of the globe.

Mounted for upward and downward sliding movement on the rods 17 of the frame within limits of 10° of latitude relative to the globe 9, is a sliding structure which forms the wind indicating structure of my device. This structure includes a central band which I will refer to as the doldrum band 20 which is of a width corresponding to 10° of latitude on the globe 9 and extends about an equatorial portion of the globe from one rod 17 to the other rod 17. This band 20 has loops 20a at its two ends within which the rods 17 are received and the shifting movement of the doldrum band 20 and hence of the wind indicating structure is limited by stops 21 attached to the rods 17 and projecting outwardly therefrom. The upper stops 21 are located at points corresponding to 10° north latitude on the globe 9, while the lower stops 21 are located at points corresponding to 10° south latitude. Attached to the extreme ends of the doldrum band 20 are a pair of light rods 22 which lie alongside of the central portions of the rods 17 and project in arcuate manner upwardly and downwardly from the doldrum band 20. Attached to the ends of these rods 22 are two bands 23 which are of a width corresponding to 5° latitude on the globe 9 and which I call the horse latitude bands. The upper horse latitude band 23 represents the northern horse latitude and is located in spaced relation from the doldrum band 20 so that its lower edge is spaced 25° of latitude north of the upper edge of the doldrum band. Similarly, the lower horse latitude band 23 represents the southern horse latitude and is located in spaced relation from the doldrum band 20 so that the upper edge of the lower band 23 is spaced 25° of latitude south of the lower edge of the doldrum band. Fingers 24 attached to the horse latitude bands 23 near their outer ends and overlying the rods 17, as best shown in Figs. 1 and 5, are used for guiding the sliding structure on the rods 17 as well as for exerting some frictional resistance to this sliding movement, thereby causing the sliding structure to be retained in any set position relative to the frame formed by rod 17 and blocks 15 and 16.

Anchored at their lower ends to the doldrum band 20 at spaced points on the doldrum band are a multiplicity of wind direction indicating elements 25 and 26 respectively which are used for indicating the direction of wind currents in the northern hemisphere. These elements 25 and 26 in the form illustrated consist of flat metallic ribbons having their upper ends pointed to represent arrows. Starting from the doldrum band 20 the elements 25 and 26 are assembled in pairs with the elements 26 underlying the elements 25. From the doldrum band each pair of elements 25 and 26 curve upwardly and outwardly from the doldrum band and extend generally in a northernly and somewhat westerly direction relative to the globe. While extending in this same direction, they are curved back toward the globe to strike the northern horse latitude band 23 to which they are secured. Shortly below the points of attachment of the elements 25 and 26 to the northern horse latitude band 23, the two elements 25 and 26 of a pair fork away from each other and after being engaged with the northern horse latitude band 23, the elements 25 diagonally incline in a northernly direction and a somewhat easternly direction. The elements 26 however after being engaged with the northern horse latitude band 23 extend downwardly in a southern and somewhat westernly direction. One or more of the elements 25, and particularly designated element 25a, is of greater length than the other elements 25 and it projects upwardly in a northernly and somewhat easternly direction and encircles the North Pole of the globe, as best seen in Figs. 1 and 3.

The portions of the elements 25 and 26 extending between the doldrum band 20 and the northern horse latitude band 23, represent the north anti-trade winds, inasmuch as the direction of extension of these elements between the doldrum band and the north horse latitude band is generally comparable to the direction followed by the north anti-trade winds relative to the globe 9 representing the earth. Similarly, the portions of the elements 25 projecting north of the northern horse latitude band 23, represent the northern westerly winds which move northeast to and around the North Pole from the northern horse latitude. The portions of the elements 26 projecting downwardly from the northern horse latitude band 23 represent the northeast trade winds which move southwest from the northern horse latitude.

Anchored at their upper ends to the doldrum band 20 at spaced points on the doldrum band, are another series of wind direction indicating elements 27 and 28, which are used for indicating the wind currents in the southern hemisphere. These elements 27 and 28 are similar to the elements 25 and 26 respectively previously described, but extend in different directions. Starting from the doldrum band 20 the elements 27 and 28 are assembled in pairs with the elements 28 underlying the elements 27. From the doldrum band each pair of elements 27 and 28 curve downwardly and outwardly and extend generally in a southernly and somewhat westernly direction relative to the globe. While extending in this same direction they are curved back toward the globe to strike the southern horse latitude band 23 to which they are secured. Shortly above the points of attachment of elements 27 and 28 to the southern horse latitude band 23, the two elements 27 and 28 of a pair fork away from each other and after being engaged with the southern horse latitude band 23, the elements 27 diagonally incline in a southernly direction and a somewhat easternly direction. The elements 28 however after being engaged with the southern horse latitude band 23 extend upwardly in a northern and somewhat westernly direction.

The portions of the elements 27 and 28 extending between the doldrum band 20 and the southern horse latitude band 23 represent the south anti-trade winds. Similarly, the portions of the elements 27 projecting south of the southern horse latitude band 23 represent the southern westernly winds which move southeast to and around the South Pole from the southern horse latitude. The portions of the elements 28 projecting upwardly from the southern horse latitude band 23 represent the southeast trade winds which move northwest from the southern horse latitude.

It will be understood that the directions given are relative to the globe 9 representing the earth.

In using the device for educational purposes, the movement of the various air currents over the earth may be readily explained by reference to the wind indicating elements and the shifting of the winds from southernly to northernly latitudes and vice versa can be demonstrated in accordance with seasonal fluctuations by sliding the wind indicating structure upwardly and downwardly on the rods 17 of the frame.

It will, of course, be understood that various changes may be made in the form, details, arrangement and proportions of the various parts without departing from the scope of the present invention, which generally stated, consists in the matter shown, and described and set forth in the appended claims.

What is claimed is:—

1. A device for depicting the paths of prevailing air currents about the earth comprising a geographical globe, a frame attached to said globe and including a pair of arcuate rods overlying the globe and extending generally north and south relative to the globe at spaced longitudes, a wind indicating structure mounted on said rods for limited upward and downward sliding movement thereon, said wind indicating structure including a central band overlying an equatorial section of the globe and upper and lower bands overlying the horse latitude sections of the globe and a multiplicity of wind direction indicating elements, certain of which are attached to said central band and said upper band and certain of which are attached to said central band and said lower band, said elements being of arched construction between said central band and said upper and lower bands and said elements having upwardly and downwardly projecting portions extending from said upper and lower bands.

2. The structure defined in claim 1, and at least one of said elements having a portion projecting upwardly from said upper band to partially encircle the North Pole of said globe.

3. A device for depicting the paths of prevailing air currents about the earth comprising a geographical globe, a doldrum band representing the doldrum belt encircling a portion of the globe adjacent the equator, horse latitude bands representing the horse latitude belts spaced above and below the said doldrum band and encircling portions of the globe at the horse latitudes thereof, means holding said bands on the globe in the spaced relation specified and air current direction indicating elements attached to the respective bands and taking the position relative to the globe of prevailing air currents, said elements including a plurality of elements for the northern hemisphere attached at their lower ends to said doldrum band and arching therefrom outwardly from the doldrum band and northernly and somewhat westernly relative to the globe and then arching back again to join the upper horse latitude band, said elements from the upper horse latitude band having portions projecting northernly and easternly and having other portions projecting southernly and westernly relative to the globe.

4. A device for depicting the paths of prevailing air currents about the earth comprising a geographical globe, a doldrum band representing the doldrum belt encircling a portion of the globe adjacent the equator, horse latitude bands representing the horse latitude belts spaced above and below the said doldrum band and encircling portions of the globe at the horse latitudes thereof, means holding said bands on the globe in the spaced relation specified and air current direction indicating elements attached to the respective bands and taking the position relative to the globe of prevailing air currents, said elements including a plurality of elements for the southern hemisphere attached at their upper ends to said doldrum band and arching therefrom outwardly from the doldrum band and southernly and somewhat westernly relative to the globe and then arching back again to join the lower horse latitude band, said elements from the lower horse latitude band having portions projecting southernly and easternly and having other portions projecting northernly and westernly relative to the globe.

5. A device for depicting the paths of prevailing air currents about the earth comprising a geographical globe, a doldrum band representing the doldrum belt encircling a portion of the globe adjacent the equator, horse latitude bands representing the horse latitude belts spaced above and below the said doldrum band and encircling portions of the globe at the horse latitudes thereof, means holding said bands on the globe in the spaced relation specified and air current direction indicating elements attached to the respective bands and taking the position relative to the globe of prevailing air currents, said elements including a plurality of elements for the northern hemisphere arching outwardly between said doldrum band and the upper horse latitude band and from the upper horse latitude band having portions projecting both upwardly and downwardly therefrom adjacent the globe and said elements including a plurality of elements for the southern hemisphere arching outwardly between said doldrum band and the lower horse latitude band and having portions adjacent the globe projecting both upwardly and downwardly from the lower horse latitude band.

BERTHA O. SMITH.